United States Patent [19]

Kikuchi et al.

[11] 4,349,063
[45] Sep. 14, 1982

[54] PNEUMATIC RADIAL TIRES

[75] Inventors: Michitsugu Kikuchi, Mitaka; Yoshio Suzuki, Higashimurayama, both of Japan

[73] Assignee: Bridgestone Tire Company Limited, Tokyo, Japan

[21] Appl. No.: 215,776

[22] Filed: Dec. 12, 1980

[30] Foreign Application Priority Data

Dec. 18, 1979 [JP] Japan ................................ 54/163452

[51] Int. Cl.$^3$ .............................................. B60C 9/00
[52] U.S. Cl. ..................................... 152/359; 57/212; 57/215; 57/902; 152/354 R; 152/356 R; 152/361 R
[58] Field of Search ............... 152/359, 357 R, 356 R, 152/356 A, 362 R, 354 R, 354 RB, 361 R, 361 FP, 361 DM; 156/110 R, 110 C; 57/212, 213, 218, 219, 215, 902; 140/5, 71 R, 93 R, 149; 245/1, 1.5

[56] References Cited

U.S. PATENT DOCUMENTS

| | | | |
|---|---|---|---|
| 1,774,748 | 9/1930 | Gore ..................................... | 245/1.5 |
| 3,858,635 | 1/1975 | Nakamoto et al. ............. | 152/359 X |
| 4,067,375 | 1/1978 | LeJeune .......................... | 152/359 X |
| 4,158,946 | 6/1979 | Bourgois ......................... | 152/359 X |

*Primary Examiner*—Edward C. Kimlin
*Assistant Examiner*—Thomas Bokan
*Attorney, Agent, or Firm*—Sughrue, Mion, Zinn, Macpeak & Seas

[57] ABSTRACT

A pneumatic radial tire is disclosed. This tire is reinforced with steel cords, each of which has such a flat or elliptic section that two or three strands, each strand being produced by twisting plural filaments, are arranged in parallel with each other so as to make the twisting directions of the adjoining strands opposite to each other to form a core and plural filaments are twisted around the core and wrapped with a spiral filament.

6 Claims, 13 Drawing Figures

FIG._2
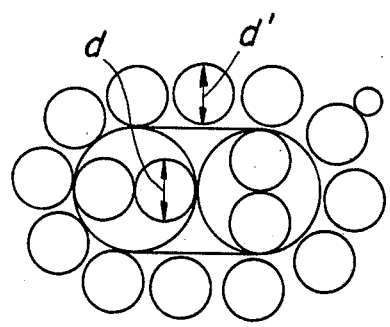
FIG._3
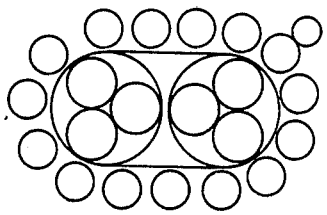
FIG._4
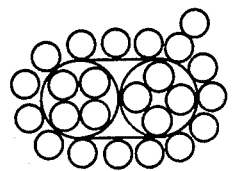
FIG._5
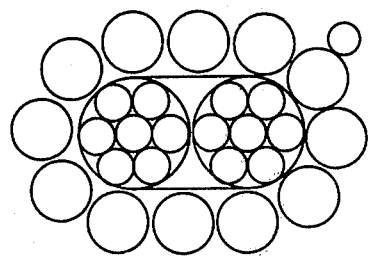
FIG._6
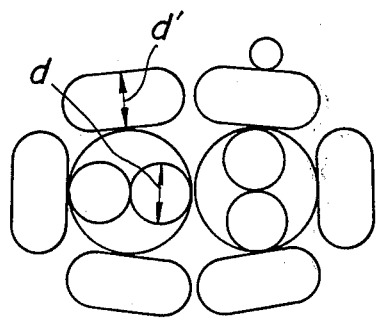
FIG._7
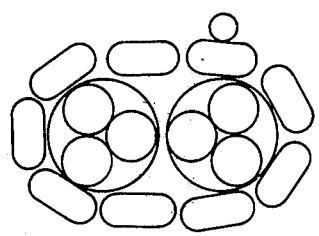

PNEUMATIC RADIAL TIRES

BACKGROUND OF THE INVENTION

This invention relates to pneumatic radial tires containing steel cords as a reinforcement, and more particularly to pneumatic radial tires having improved fatigue resistance and rolling resistance by reinforcing with steel cords each having a flat or elliptic section.

As reinforcements for this type of tire, there have hitherto been widely used steel cords of a strand construction wherein two or more circular filaments are twisted to form a strand. Then, a plurality of the resulting strands are twisted with each other, steel cords of a bundle-twisted construction wherein plural filaments are arranged concentrically and then twisted with each other, and the like. However, the strand construction cords have drawbacks in that the utilization of filament strength is low and fretting is apt to occur though the input in the deformation is small, while the bundle-twisted cords have drawbacks in that the input in the deformation is large and hence material fatigue is apt to occur through the utilization of filament strength is high and fretting hardly occurs. Among these cords, strand construction cords are particularly produced through a complicated twisting step, so that productivity is poor. In order to improve such productivity, therefore, there is a need to simplify the cabling step in a simple structure.

Now, steel cords for tire reinforcement are required to have high strength, excellent fatigue resistance and the like. In the latest radial tires having a low aspect ratio or the like, it becomes particularly important to mitigate the input of strain in the side portion of the tire. That is, the improvement of fatigue resistance in the steel cord is increasingly required together with high strength. In addition, there is a requirement to render the tire building workability (the bending property of steel cord) satisfactory. For this purpose, it is desired to twist a large number of filaments having a smaller diameter with each other, but such a twisting construction deteriorates the productivity of steel cords from the viewpoint of economy and also, the strength of the steel cord reduces.

In order to solve the above drawbacks, steel cords, wherein two or more filaments having a circular section or an irregular section other than circle are arranged in parallel with each other and wrapped with a spiral filament, have been proposed in Japanese Utility Model laid open No. 70,002/78. However, such steel cords have the following drawbacks. That is, when the cord is subjected to a bending deformation, the inside portion of the cord against the bending is compressed, while the outside portion against the bending is stretched. Hence, the cord is apt to be subjected to material fatigue due to the fact that filaments in the cord are arranged in parallel with each other, and in some cases the filaments in the inside portion against the bending are apt to be folded and finally the cord is broken.

Now, the inventors have previously proposed a steel cord wherein two or three strands each composed of plural filaments are arranged in parallel with each other to form a core and plural filaments are twisted around the core and wrapped with a spiral filament as disclosed in Japanese patent application No. 119,208/79 laid open Apr. 21, 1981. However, some of the resulting steel cords are very poor in the twisting stability, so that workability is deteriorated during the rubber coating for steel cord, or rotational disorder is produced in steel cords 2 embedded in rubber 1 as shown in FIG. 1a to easily cause the distortion of the rubberized cord layer. That is, they have frequently a bad influence on the tire building workability.

SUMMARY OF THE INVENTION

The inventors have made various studies in order to solve the above mentioned drawbacks of the prior art and found that these drawbacks produced by steel cords having such a bad twisting stability are due to the fact that the twisting directions of the adjoining strands arranged in parallel with each other constituting the core are the same. On the basis of such knowledge, it has been confirmed that the above drawbacks are solved by arranging the adjoining strands in the core in parallel with each other to make the twisting directions of these strands opposite to each other. As a result, the invention has been accomplished.

According to the invention, there is a provision of a pneumatic radical tire characterized by reinforcing with steel cords, each of which having a flat or elliptic section such that two or three strands, each strand being produced by twisting plural filaments of 0.1~0.4 mm diameter, are arranged in parallel with each other to make the twisting directions of said adjoining strands opposite to each other to form a core and plural filaments are twisted around said core and wrapped with a spiral filament, provided that a ratio of a diameter (d') of filaments twisted around said core corresponding to the bending direction of the cord to a diameter (d) of filaments constituting said core is 0.3~2.0.

BRIEF DESCRIPTION OF THE DRAWING

The invention will now be described with reference to the accompanying drawings, wherein:

FIGS. 2 to 11 are diagrammatically sectional views of embodiments of the steel cord used in the pneumatic radial tire according to the invention, respectively.

DESCRIPTION OF THE PREFERRED EMBODIMENTS

Figure 1A:
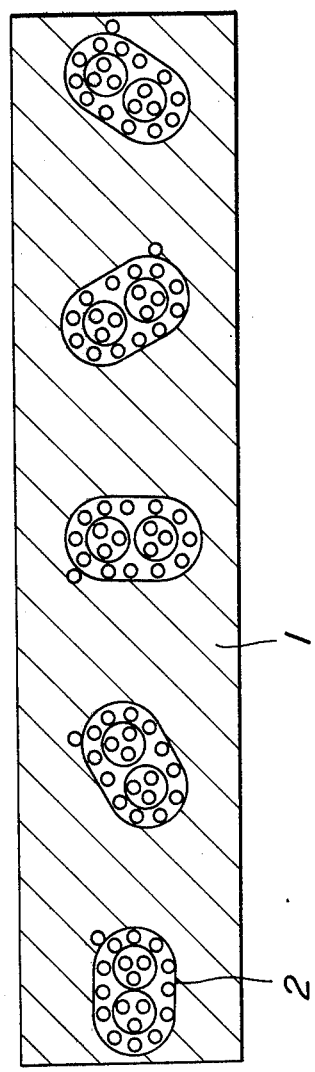
FIG. 1a is a diagrammatically sectional view of a composite material produced by embedding steel cords as disclosed in Japanese patent application No. 119,208/79 in rubber.

In FIGS. 2 to 5 are diagrammatically shown various embodiments in section of the steel cord used in the pneumatic radial tire according to the invention, respectively. The steel cord shown in FIG. 2 has a 2(1×2)×0.3+12×0.3+1×0.15 construction such that two strands, one of which being produced by twisting two filaments of 0.3 mm diameter (d) in an S-twisting direction and the other being produced by twisting the same two filaments in a Z-twisting direction, are arranged in parallel with each other to form a core and twelve filaments of 0.3 mm diameter (d') are twisted around the core and wrapped with a spiral filament of 0.15 mm diameter. The steel cord shown in FIG. 3 has such a 2(1×3)×0.25+15×0.20+1×0.15 construction that two strands, one of which being produced by twisting three filaments of 0.25 mm diameter in an S-twisting direction and the other being produced by twisting three filaments in a Z-twisting direction, are arranged in parallel with each other to form a core and fifteen filaments of 0.20 mm diameter are twisted around the core and wrapped with a spiral filament of 0.15 mm diameter. The steel cord shown in FIG. 4 has a $2(1\times4)\times0.15+15\times0.15+1\times0.15$ construction such that two strands, one of which being produced by twisting four filaments of 0.15 mm diameter in an S-twisting direction and the other being produced by twisting the same four filaments in a Z-twisting direction, are arranged in parallel with each other to form a core and fifteen filaments of 0.15 mm diameter are twisted around the core and wrapped with a spiral filament of 0.15 mm diameter. The steel cord shown in FIG. 5 has such a $2(1\times7)\times0.18+12\times0.3+1\times0.15$ construction that two strands, one of which being produced by twisting seven filaments of 0.18 mm diameter in an S-twisting direction and the other being produced by twisting the same seven filaments in a Z-twisting direction, are arranged in parallel with each other to form a core and twelve filaments of 0.3 mm diameter are twisted around the core and wrapped with a spiral filament of 0.15 mm diameter.

According to the invention, the steel cord is shaped into a flat or elliptic section by arranging two or three strands, each being composed of plural filaments, in parallel with each other to make the twisting directions of the adjoining strands opposite to each other to form a core and twisting plural filaments around the core. When the steel cords according to the invention are used, for example, in the carcass of the tire, the bending ability of the carcass in the bead portion becomes good. Moreoever, when the cord is bent at a certain curvature (R) and the diameter of the cord is D, the maximum stress $\sigma$ produced in the filaments of the cord, is directly proportional to D/R. That is, when the curvature is constant, the stress produced in the filaments becomes smaller with the reduction of D and as a result, the reduction of the cord strength due to the bending fatigue becomes small. Therefore, it makes possible that the cord diameter corresponding to the bending direction of the cord is reduced without decreasing the cord strength by arranging two or more strands constituting the core in parallel with each other and also the reduction of cord strength as a whole is minimized by increasing the number of filaments for the core hardly susceptible to fretting because the reduction of the strength of the filament itself due to the fretting is larger in the filaments twisted around the core than in the filaments for the core. However, if the number of the strands constituting the core exceeds 3, the production of steel cords is very difficult, so that the number of strands constituting the core should be 2 or 3.

Figure 1B:
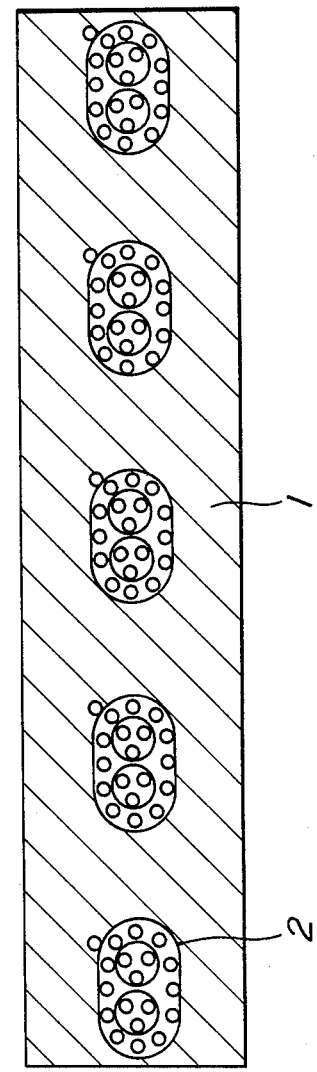
FIG. 1b is a diagrammatically sectional view of a composite material produced by embedding steel cords according to the invention in rubber.
Figure 8:
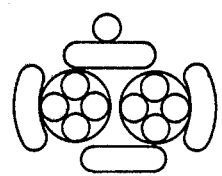
Figure 9:
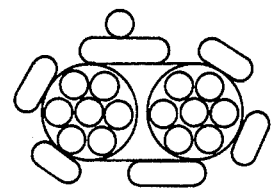

Since the twisting directions of the adjoining strands arranged in parallel with each other to form a core are opposite to each other, the twisting deformation of the strands is counterbalanced to improve the twisting stability of the steel cord, which not only has a good influence on the tire building workability, but also prevents the rotational disorder of steel cords embedded in rubber as shown in FIG. 1a, i.e. steel cords 2 embedded in rubber 1 are accurately arranged in the rubberized cord layer as shown in FIG. 1b. As a result, the bending fatigue resistance inherent to the steel cord having a flat or elliptic section can fully be developed and hence the fatigue resistance of the tire is improved.

Other preferred embodiments of the steel cord according to the invention are shown in FIGS. 6 to 9 using plate filaments as a filament to be twisted around the core. The steel cord shown in FIG. 6 has such a $2(1\times2)\times0.3+6\times(0.3\times0.6)+1\times0.15$ construction that six plate filaments of 0.3 mm×0.6 mm (thickness×width) are twisted around the same core as shown in FIG. 2 and wrapped with a spiral filament of 0.15 mm diameter. The steel cord shown in FIG. 7 has a $2(1\times3)\times0.25+9\times(0.2\times0.4)+1\times0.15$ construction such that nine plate filaments of 0.2 mm×0.4 mm are twisted around the same core as shown in FIG. 3 and wrapped with a spiral filament of 0.15 mm diameter. The steel cord shown in FIG. 8 has a $2(1\times4)\times0.15+4\times(0.15\times0.45)+1\times0.15$ construction such that four plate filaments of 0.15 mm×0.45 mm are twisted around the same core as shown in FIG. 4 and wrapped with a spiral filament of 0.15 mm diameter. The steel cord shown in FIG. 9 has such a $2(1\times7)\times0.18+\{4\times(0.18\times0.36)+2\times(0.18\times0.54)\}+1\times0.15$ construction that four plate filaments of 0.18 mm×0.36 mm and two plate filaments of 0.18 mm×0.54 mm are twisted around the same core as shown in FIG. 5 and wrapped with a spiral filament of 0.15 mm diameter. In these steel cords, the contacting parts between the core and the filaments twisted therearound and between these filaments and the spiral filament are line contact because plate filaments having a flat section are used as the filament to be twisted around the core. Therefore, the contact pressure in the contacting part reduces and the steel cord is hardly subjected to fretting which is a cause of reducing the cord strength.

Figure 10:
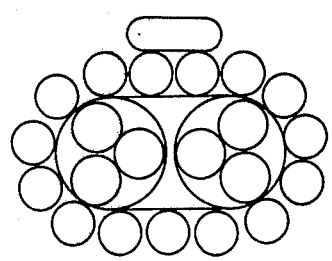

In FIG. 10 is shown a further embodiment of the steel cord according to the invention, which has such a $2(1\times3)\times0.25+15\times0.2+1\times(0.15\times0.3)$ construction that a plate filament having a flat section of 0.15 mm×0.3 mm is used as the spiral filament.

Figure 11:
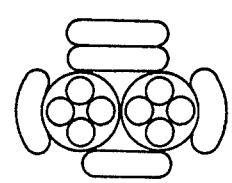

In FIG. 11 is shown an embodiment of the steel cord according to the invention, which has such a $2(1\times4)\times0.15+4\times(0.15\times0.45)+1\times(0.15\times0.45)$ construction that plate filaments each having a flat section of 0.15 mm×0.45 mm are used as the filament to be twisted around the core and the spiral filament, respectively. In such a steel cord, the contacting part between the filaments twisted around the core and the spiral filament is area contact, so that the contact pressure in the contacting part can further be mitigated.

In the steel cord according to the invention, it is preferable that the ratio of diameter (d') of filaments twisted around the core corresponding to the bending direction of the cord to diameter (d) of filaments constituting the core is 0.3~2.0. The term "diameter (d') corresponding to the bending direction of cord" used herein means a diameter of a filament having a circular section as shown in FIG. 2 or a minor axis diameter of a plate filament having a flat section as shown in FIG. 6. When the ratio d'/d is less than 0.3, the fastening against the strands constituting the core is weak, the movement of filaments inside the cord is large and the fatigue failure due to fretting is accelerated. While, when the ratio d'/d exceeds 2.0, the steel cord is apt to be subjected to material fatigue. In any case, when the ratio d'/d is outside the defined range, the cord strength reduces. Moreover, when the steel cord is used as a carcass, the ratio d'/d is preferably 0.5~1.5, while when the steel cord is used in a belt, the ratio d'/d is preferably 1.5~2.0.

In the steel cord according to the invention, the strength of the filaments can advantageously be utilized when the twisting pitch of filaments constituting the core is 5~15 mm and the twisting pitch of filaments twisted around the core is 10~18 mm.

The steel cords of the above mentioned construction to be used in pneumatic radial tire according to the invention have advantages given by the conventional strand construction cord and bundle-twisted cord, i.e. such advantages that the material fatigue hardly occurs owing to the small input in the deformation, the utilization of filament strength is high and the influence by fretting is less. Therefore, when the steel cords according to the invention are applied to the pneumatic radial tires, the fatigue resistance of the tire is considerably improved. Furthermore, since steel cords are flat or elliptic in section, the gauge of the coating rubber can be thinned. As a result, the tire weight can be reduced and hence the rolling resistance becomes smaller.

Moreover, the steel cords according to the invention not only do not adversely affect the workability inclusive of calendering step, but also have a large bending ability, so that the tire building workability is considerably improved.

The invention will be described in greater detail by means of the following examples.

EXAMPLE 1

Pneumatic radial tires having a tire size of 10.00R20 14 PR were manufactured by using various steel cords shown in the following Table 1 as a carcass and using steel cords of $1\times3\times0.2+6\times0.38$ construction as a belt, and then the fatigue resistance and rolling resistance were examined with respect to these tires. The fatigue resistance was evaluated by a strength retention (%) of cord strength after running to cord strength before running, wherein cord strength was measured by an Instron tensile testing machine with respect to two samples of rubberized steel cord cut out from the carcass, one of which being before the running and the other being after the running over a distance of 300,000 km while recapping the tread every 100,000 km. The bending fatigue test in laboratory per steel cord was evaluated by the bending number until the cord is broken by repeatedly bending the cord on a three pulley tester provided with a movable pulley of 32 mm diameter under a load corresponding to 10% of cord strength at breaking. The rolling resistance was measured as follows: that is, the test tire subjected to an internal pressure of 7.25 kg/cm$^2$ was run on a drum of 3 m diameter rotating at a speed of 50 km/hr under a load of 2,425 kg for a predetermined time and then the change of torque was measured in a predetermined time after the driving of the drum was stopped. The rolling resistance was defined by an index on the basis that the tire No. 1 is 100. The larger the numerical value of the index, the lower the rolling resistance.

The results thus measured are also shown in Table 1. It can be seen from Table 1 that the tires No. 4~7 according to the invention are considerably superior in the fatigue resistance and rolling resistance to the tires No. 1~3 and 8.

TABLE 1(a)

| | | Tire No. | | | |
|---|---|---|---|---|---|
| | | 1 Prior art | 2 Control* | 3 Control | 4 Present invention |
| Filament diameter in core d(mm) | | | | 0.4 | 0.2 |
| Filament diameter in sheath d'(mm) | | | | 0.12 | 0.16 |
| d'/d | | | | 0.25 | 0.8 |
| Twisting direction** | | | | (SZ)SZ | (ZS)ZS |
| Twisting construction | | 7×4×0.175+1×0.15 | 1×10×0.3+1×0.15 | 2(1×3)×0.4+38 ×0.12+1×0.15 | 2(1×3)×0.2+15 ×0.16+1×0.15 |
| Fatigue resistance | Cord strength before running (kg) | 180 | 180 | 300 | 140 |
| | Cord strength after running (kg) | 128 | 148 | 204 | 122 |
| | Strength retention (%) | 71 | 82 | 68 | 87 |
| Bending fatigue test in laboratory (bending number) | | 3765 | 4610 | 4365 | 5704 |
| Rolling resistance | | 100 | 110 | 104 | 120 |

TABLE 1(b)

| | | Tire No. | | | |
|---|---|---|---|---|---|
| | | 5 Present invention | 6 Present invention | 7 Present invention | 8 Control |
| Filament diameter in core d(mm) | | 0.2 | 0.2 | 0.2 | 0.18 |
| Filament diameter in sheath d'(mm) | | 0.16 | 0.2 | 0.24 | 0.4 |
| d'/d | | 0.8 | 1.0 | 1.2 | 2.2 |
| Twisting direction** | | (SZ)ZS | (ZS)SZ | (SZ)ZS | (ZS)SZ |
| Twisting construction | | 2(1 × 4) × 0.2 + 15 ×0.16 + 1 × 0.15 | 2(1 × 3) × 0.2 + 13 × 0.2 + 1 × 0.15 | 2(1 × 3) × 0.2 + 11 × 0.24 + 1 × 0.15 | 2(1 × 3) × 0.18 + 7 ×0.4 + 1 × 0.15 |
| Fatigue | Cord strength before running (kg) | 162 | 170 | 180 | 240 |
| | Cord strength | 143 | 148 | 155 | 154 |

TABLE 1(b)-continued

| | | Tire No. | | | |
|---|---|---|---|---|---|
| | | 5 Present invention | 6 Present invention | 7 Present invention | 8 Control |
| resistance | after running (kg) | | | | |
| | Strength retention (%) | 88 | 87 | 86 | 64 |
| Bending fatigue test in laboratory (bending number) | | 5645 | 5587 | 5529 | 4074 |
| Rolling resistance | | 117 | 116 | 111 | 102 |

Figure 12:
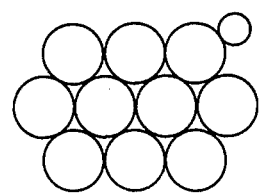
FIG. 12 is a diagrammatically sectional view of the steel cord disclosed in Japanese Utility Model laid open No. 70,002/78.

(Note)
*Steel cord used in Experiment No. 9 of Japanese Utility Model laid open No. 70,002/78 and having such a section as shown in FIG. 12.
**twisting direction of (core) · sheath · spiral

EXAMPLE 2

Pneumatic radial tires were manufactured in the same manner as described in Example 1 except that steel cords as shown in the following Table 2 were used as a carcass and then the fatigue resistance thereof was evaluated in the same manner as described in Example 1 to obtain a result as shown in Table 2.

As seen from Table 2, the tires No. 9, 12, 13 and 16 according to the invention are excellent in the fatigue resistance.

EXAMPLE 3

Pneumatic radial tires were manufactured in the same manner as described in Example 1 except that steel cords as shown in the following Table 3 were used as a carcass and then the fatigue resistance thereof was evaluated in the same manner as described in Example 1 to obtain a result as shown in Table 3.

It can be seen from Table 3 that the fatigue resistance is further improved when filaments for sheath (filaments twisted around core) and/or spiral filament in the steel cord are made flat in section.

TABLE 2(a)

| | | Tire No. | | | |
|---|---|---|---|---|---|
| | | 9 Present invention | 10 Control | 11 Control | 12 Present invention |
| Filament diameter in core d(mm) | | 0.2 | 0.2 | 0.2 | 0.2 |
| Filament diameter in sheath d'(mm) | | 0.16 | 0.16 | 0.16 | 0.16 |
| d'/d | | 0.8 | 0.8 | 0.8 | 0.8 |
| Twisting direction | | (ZS)ZS | (SS)ZS | (ZZ)SZ | (SZ)SZ |
| Twisting construction | | 2(1 × 3) × 0.2 + 15 × 0.16 + 1 × 0.15 | 2(1 × 3) × 0.2 + 15 × 0.16 + 1 × 0.15 | 2(1 × 3) × 0.2 + 15 × 0.16 + 1 × 0.15 | 2(1 × 3) × 0.2 + 15 × 0.16 + 1 × 0.15 |
| | Cord strength before running (kg) | 140 | 140 | 140 | 140 |
| Fatigue resistance | Cord strength after running (kg) | 122 | 102 | 106 | 123 |
| | Strength retention (%) | 87 | 73 | 76 | 88 |

TABLE 2(b)

| | | Tire No. | | | |
|---|---|---|---|---|---|
| | | 13 Present invention | 14 Control | 15 Control | 16 Present invention |
| Filament diameter in core d(mm) | | 0.2 | 0.2 | 0.2 | 0.2 |
| Filament diameter in sheath d'(mm) | | 0.16 | 0.16 | 0.16 | 0.16 |
| d'/d | | 0.8 | 0.8 | 0.8 | 0.8 |
| Twisting direction | | (SZ)ZS | (SS)ZS | (ZZ)SZ | (ZS)SZ |
| Twisting construction | | 2(1 × 4) × 0.2 + 15 × 0.16 + 1 × 0.15 | 2(1 × 4) × 0.2 + 15 × 0.16 + 1 × 0.15 | 2(1 × 4) × 0.2 + 15 × 0.16 + 1 × 0.15 | 2(1 × 4) × 0.2 + 15 × 0.16 + 1 × 0.15 |
| | Cord strength before running (kg) | 162 | 162 | 162 | 162 |
| Fatigue resistance | Cord strength after running (kg) | 143 | 122 | 117 | 141 |
| | Strength retention (%) | 88 | 75 | 72 | 87 |

TABLE 3

| | Tire No. | | | | |
|---|---|---|---|---|---|
| | 19 Present invention | 20 Present invention | 21 Present invention | 22 Present invention | 23 Present invention |
| Filament diameter in core d(mm) | 0.2 | 0.2 | 0.2 | 0.2 | 0.2 |
| Filament diameter in sheath d'(mm) | 0.16 | 0.16 | 0.16 | 0.16 | 0.16 |
| d'/d | 0.8 | 0.8 | 0.8 | 0.8 | 0.8 |

TABLE 3-continued

| | | Tire No. | | | | |
|---|---|---|---|---|---|---|
| | | 19 Present invention | 20 Present invention | 21 Present invention | 22 Present invention | 23 Present invention |
| Twisting direction | | (ZS)SZ | (SZ)SZ | (ZS)ZS | (SZ)SZ | (SZ)SZ |
| Twisting construction | | 2(1×3)×0.2+7 ×(0.16×0.32) +1×0.15 | 2(1×4)×0.2+7 ×(0.16×0.32) +1×0.15 | 2(1×3)×0.2 +15×0.16+1 ×(0.15×0.3) | 2(1×4)×0.2 +15×0.16+1 ×(0.15×0.2) | 2(1×4)×0.2+7 ×(0.16×0.32) +1×(0.15×0.3) |
| Fatigue resistance | Cord strength before running (kg) | 133 | 155 | 140 | 162 | 155 |
| | Cord strength after running (kg) | 125 | 143 | 127 | 151 | 147 |
| | Strength retention (%) | 94 | 92 | 91 | 93 | 95 |

What is claimed is:

1. In a pneumatic radial tire containing steel cords as a reinforcement for at least one of the carcass and belt thereof, the improvement comprising; said steel cords having such a flat section inclusive of an elliptic section that two to three strands, each strand being produced by twisting plural filaments of 0.1–0.4 mm diameter, are arranged in parallel with each other to form a core and plural filaments are twisted around said core and wrapped with a spiral filament, the filaments in one strand constituting said core twisted in the "S" direction and the filaments in the adjacent strand twisted in the "Z" direction and, a ratio of a diameter of filaments twisted around said core corresponding to the bending direction of said core to a diameter of filaments constituting said core is 0.3–2.0.

2. A pneumatic radial tire as claimed in claim 1, wherein said filaments twisted around said core are flat in section.

3. A pneumatic radial tire as claimed in claim 1, wherein said spiral filament is flat in section.

4. A pneumatic radial tire as claimed in claim 1, wherein said filaments constituting said core having a twisting pitch of 5–15 mm and said filaments twisted around said core have a twisting pitch of 10–18 mm.

5. A pneumatic radial tire as claimed in claim 1, wherein said filaments twisted around said core are elliptic in section.

6. A pneumatic radial tire as claimed in claim 1, wherein said spiral filaments is elliptic in section.

* * * * *